C. A. WAITE.
ROTARY VALVE FOR INTERNAL COMBUSTION ENGINES.
APPLICATION FILED JAN. 25, 1918.
1,280,597.
Patented Oct. 1, 1918.
2 SHEETS—SHEET 1.
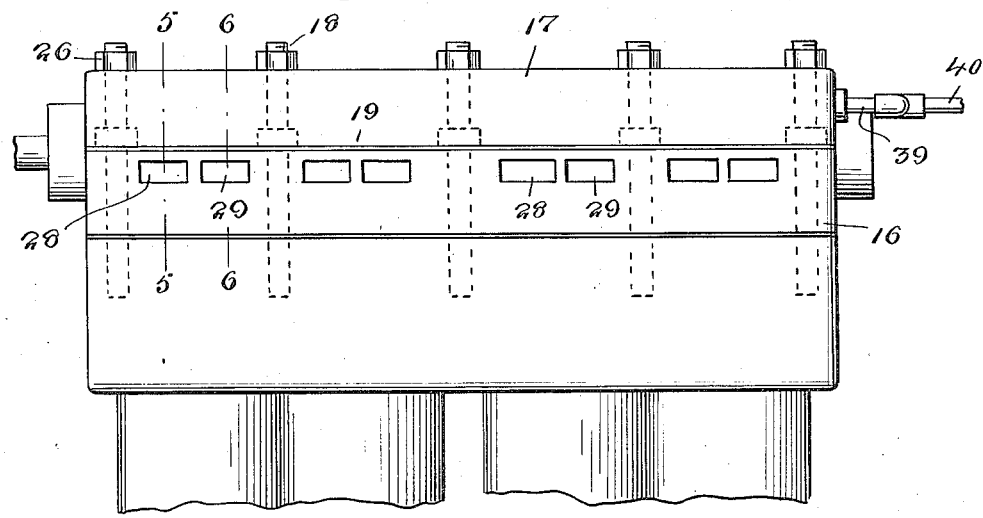
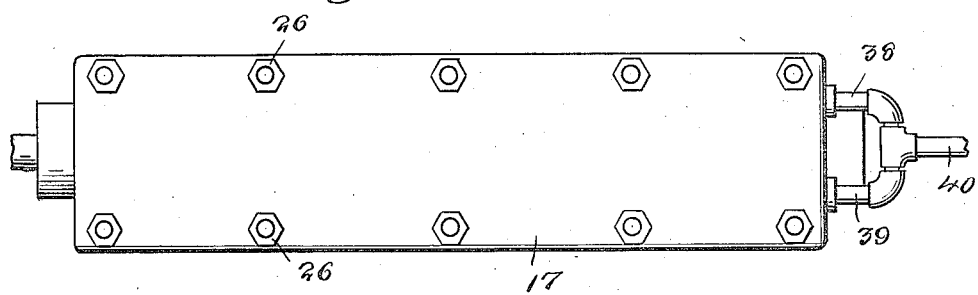
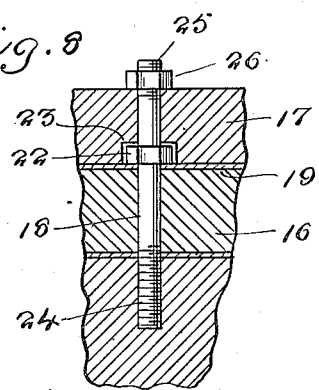
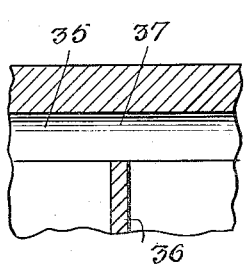
Inventor
C. A. Waite
Witness
E. R. Ruppert
By Victor J. Evans
Attorney

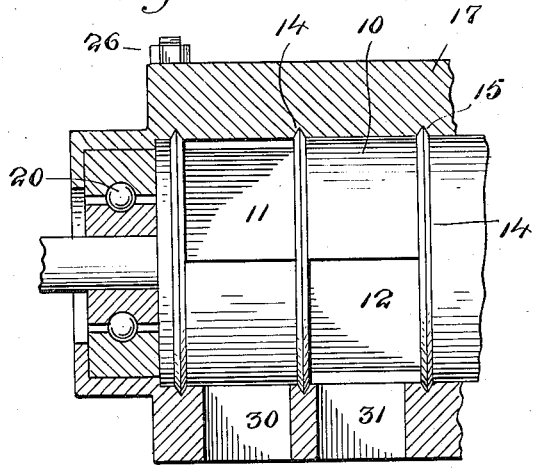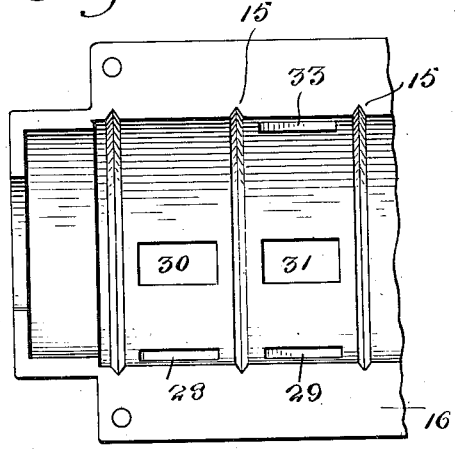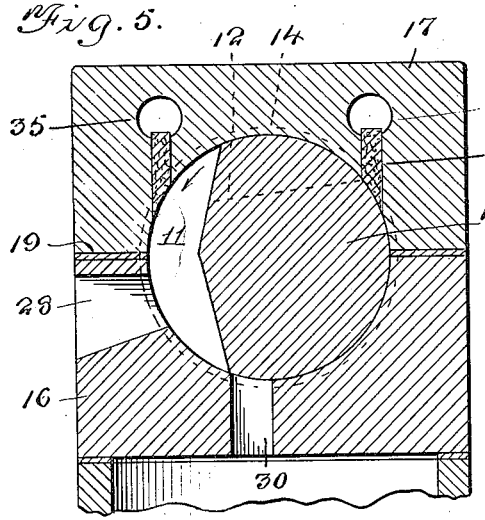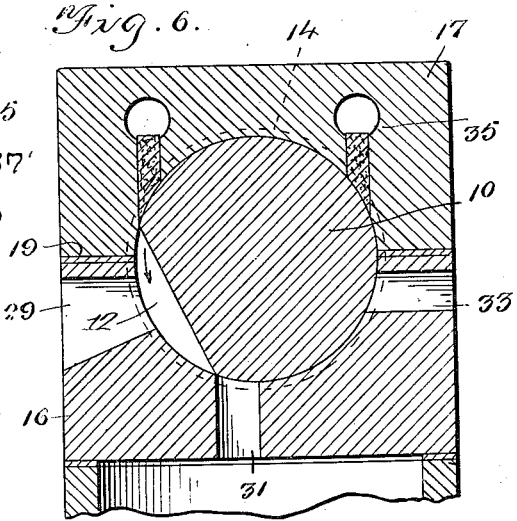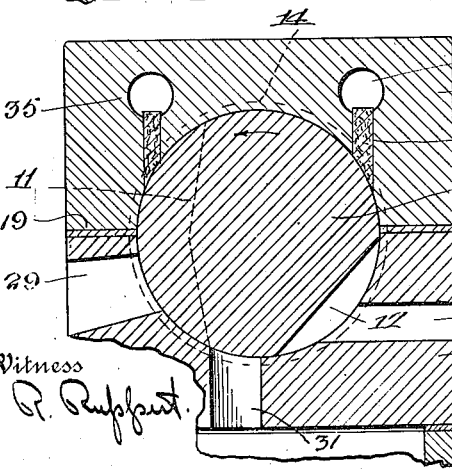

UNITED STATES PATENT OFFICE.

CHARLES A. WAITE, OF WEST LIBERTY, IOWA, ASSIGNOR TO A. L. RICHARDS, B. W. ROWLEN, W. A. HECK, W. C. KIMBERLY, E. G. JAMES, H. J. SMITH, AND IRWIN AIKINS, OF WEST LIBERTY, IOWA.

ROTARY VALVE FOR INTERNAL-COMBUSTION ENGINES.

1,280,597.      Specification of Letters Patent.      Patented Oct. 1, 1918.

Application filed January 25, 1918. Serial No. 213,757.

*To all whom it may concern:*

Be it known that I, CHARLES A. WAITE, a citizen of the United States, residing at West Liberty, in the county of Muscatine and State of Iowa, have invented new and useful Improvements in Rotary Valves for Internal-Combustion Engines, of which the following is a specification.

This invention relates to rotary valves for internal combustion engines, and one object is to provide an exhaust port which shall be opened immediately after the closing of the usual exhaust port, and which shall provide for the relief of the pressure within the cylinder, permitting the complete expulsion of the smoke and the products of combustion, that is the gases resulting from the explosion.

A further object is to provide a rotary valve controlling the intake and exhaust for each cylinder of a four cycle engine, and an auxiliary exhaust independent of the main exhaust.

A further object is to provide a rotary valve member having ports registering with the intake and exhaust ports of each cylinder of a four cycle engine, the valve member being provided with annular flanged portions coöperating with grooves in the valve casing and providing an effective cut off between the several series of ports.

A further object is to provide for taking up wear and for the regrinding of the valve directly in the valve casing.

A still further object is to provide for uniform expansion by locating a plurality of exhaust ports between each set of inlet ports.

A still further object is to provide for overcoming the difficulty heretofore experienced in retaining the compression and at the same time holding the exhaust ports open for a sufficient length of time to effect the complete expulsion of the gases resulting from the explosion.

In the accompanying drawings:

Figure 1 is a view of the valve casing in side elevation,

Fig. 2 is a top plan view of the casing,

Fig. 3 is a vertical longitudinal section, the casing and valve member being shown as broken away, Fig. 4 is a top plan of a portion of the lower section of the valve casing and a portion of the valve member, Fig. 5 is a section on the line 5—5 of Fig. 1, Fig. 6 is a section on the line 6—6 of Fig. 1, Fig. 7 is a section corresponding to that shown in Fig. 6, with the valve member in a position for exhausting gases through the auxiliary exhaust port, Fig. 8 is a fragmentary section showing means for connecting the upper and lower sections of the valve casing, Fig. 9 is a fragmentary section showing an oil duct described below.

The engine provided with a valve constructed as herein described has been thoroughly tested by competent engineers and it has been found that the results secured justify the positive statement that the horse power of any well constructed engine is very materially increased when employing a rotary valve of this type.

The valve member is designed to extend throughout the length of a bore provided in the engine frame, without reference to the number of cylinders employed. The valve member is rotated at one-half the speed of the crank shaft and in the opposite direction.

This valve member is designated 10 and is provided with a plurality of cutaway portions 11, 12, opposite each cylinder, the cutaway portion or port 11 serving as the intake, and the port 12 controlling the exhaust. Valve member 10 is provided with a plurality of annular ribs or flanged members 14 coöperating with grooves 15 formed in the valve casing and providing a positive cut off between the several ports. These grooves also serve an important function in connection with the lubrication of the valve.

The lower portion of the valve casing designated 16 constitutes the head plate of the engine and the upper portion 17 is removable, being secured in position by means of bolts 18, the upper and lower sections of the casing being separated by shims 19. The removal of one or more of these shims permits the adjustment of the valve casing after regrinding, occasioned by wear. The valve may be ground directly in the casing, the ball bearings 20 being taken up after grinding to provide the required adjustment. The bolts 18 are each provided with a collar 22, which in fact constitutes the head of the bolt and this head is hexagonal in form, the casing being recessed as shown at 23 for the accommodation of the head. The opposite ends 24 and 25 of the bolt are threaded, the lower ends engaging the engine frame and the upper ends projecting through the upper casing member and being engaged by nuts 26.

This construction, last named, permits the upper casing member to be removed by disengaging the nuts 26, while the lower section of the casing remains in position.

The intake port for each cylinder is designated 28, and the exhaust port leading directly to each cylinder is designated 29. The intake port in the lower casing member is shown at 30, and the main exhaust port is designated 31. The auxiliary exhaust port in the casing, constituting one of the principal features of this invention, is designated 33 and is located opposite the main exhaust port 31, and therefore on the other side of the port 29 communicating with the cylinder.

The engine operates as a four cycle engine and the auxiliary port 33 for each cylinder opens immediately after the main exhaust port of each cylinder closes, thereby providing the necessary relief and effecting a perfect scavengering operation. The construction therefore overcomes one of the chief difficulties heretofore encountered, in that the exhaust port closes too soon and prevents the smoke and other products of the explosion from being thoroughly discharged.

Another important feature of the invention is that an intake port is located between the exhaust ports, considering the several cylinders of the engine and the arrangement of their ports, and absolutely uniform expansion is provided for.

In order to further lubricate the valves, a plurality of recesses are provided in the upper casing members, these recesses being designated 35 and being separated by partition walls 26 having the ports 37 therein, whereby the oil may pass through a series of these recesses on each side of the upper casing member, and from one end of the valve casing to the other end. The oil inlets for these recesses 35 are in the form of pipes 38 and 39 connected with a common pipe 40 having communication with the oil circulation between the crank case and the oil receptacle at the dash board. Each recess 35 opens directly to the inner portion of the upper casing member and is therefore in communication with the bore for the valve. The openings at the bore are closed by means of strips or pads of felt 37' which become thoroughly saturated with lubricating material and provide for the lubrication of the valve.

What is claimed is:

1. In a device of the class described, a valve casing, a rotary valve member mounted within said casing and provided with a plurality of ports located opposite each cylinder of an engine communicating with said casing, the casing having an inlet port adapted to communicate with a manifold, and having an inlet port communicating with the cylinder, and having an exhaust port communicating with the cylinder, an exhaust port adapted to communicate with a manifold, and an auxiliary exhaust port coöperating with the aforesaid exhaust ports of the valve and casing.

2. In a device of the class described, a valve casing, a valve member operating therein and having a plurality of ports, said casing being provided with an inlet port adapted to communicate with a cylinder, an exhaust port also communicating with the cylinder, and a plurality of exhaust ports on opposite sides of the exhaust port first named.

3. In a device of the class described, a valve casing, a cylinder having communication with said casing by means of an exhaust port, and an inlet port in the casing, the casing being provided with a plurality of exhaust ports oppositely located, said valve member placing one of said exhaust ports of the casing in communication with the cylinder immediately after the other of said exhaust ports has been closed.

4. A valve casing, a rotary valve member mounted therein, said member being provided with annular flanges, and the casing being provided with grooves coöperating with the flanges and with inlet and exhaust ports located respectively on opposite sides of certain of the flanges, certain of the exhaust ports communicating with the cylinder, and others of said exhaust ports extending through the casing in opposite directions and on opposite sides of the exhaust port communicating with the cylinder.

5. In a device of the class described, a valve casing comprising an upper and lower section, a rotary valve mounted in the casing, bolts threaded on opposite ends and including collars intermediate of the ends, said collars engaging the upper portion of the lower casing section and said bolts being adapted to engage threaded apertures in an engine frame, the upper casing section being removable without removing the bolts.

In testimony whereof I affix my signature.

CHARLES A. WAITE.